United States Patent
Findikoglu

(10) Patent No.: US 7,781,067 B2
(45) Date of Patent: Aug. 24, 2010

(54) ALIGNED CRYSTALLINE SEMICONDUCTING FILM ON A GLASS SUBSTRATE AND METHOD OF MAKING

(75) Inventor: Alp T. Findikoglu, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 379 days.

(21) Appl. No.: 11/581,978

(22) Filed: Oct. 17, 2006

(65) Prior Publication Data

US 2008/0090072 A1    Apr. 17, 2008

(51) Int. Cl.
- B32B 17/06 (2006.01)
- B32B 15/00 (2006.01)
- B32B 9/00 (2006.01)
- B32B 19/00 (2006.01)

(52) U.S. Cl. ........... 428/428; 428/426; 428/432; 428/698; 428/699; 428/702

(58) Field of Classification Search ......... 428/701, 428/702, 426, 428, 432, 698, 699; 505/237, 505/238
See application file for complete search history.

(56) References Cited

U.S. PATENT DOCUMENTS

| | | | |
|---|---|---|---|
| 5,650,378 A | | 7/1997 | Iijima et al. |
| 5,872,080 A | | 2/1999 | Arendt et al. |
| 6,190,752 B1 | * | 2/2001 | Do et al. ............ 428/141 |
| 2003/0019668 A1 | * | 1/2003 | Reade et al. ........... 177/84 |
| 2003/0144150 A1 | * | 7/2003 | Arendt et al. ......... 505/237 |
| 2006/0115964 A1 | * | 6/2006 | Findikoglu et al. ...... 438/509 |

OTHER PUBLICATIONS http://www.glassdynamicsllc.com/Alkali%20Free%20Borosilicate%201737.htm, retrieved on Nov. 9, 2008.*

Findikoglu et al. ("Well orientated Silicon on Thin Films with High Carrier Mobility on Polycrystalline Substrates") Advanced Materials. vol. 17. 2005, pp. 1527-1531.*

* cited by examiner

Primary Examiner—Timothy M Speer
Assistant Examiner—Jonathan C Langman
(74) Attorney, Agent, or Firm—Robert P. Santandrea; Samuel L. Borkowsky

(57) ABSTRACT

A semiconducting structure having a glass substrate. In one embodiment, the glass substrate has a softening temperature of at least about 750° C. The structure includes a nucleation layer formed on a surface of the substrate, a template layer deposited on the nucleation layer by one of ion assisted beam deposition and reactive ion beam deposition, at least on biaxially oriented buffer layer epitaxially deposited on the template layer, and a biaxially oriented semiconducting layer epitaxially deposited on the buffer layer. A method of making the semiconducting structure is also described.

13 Claims, 4 Drawing Sheets

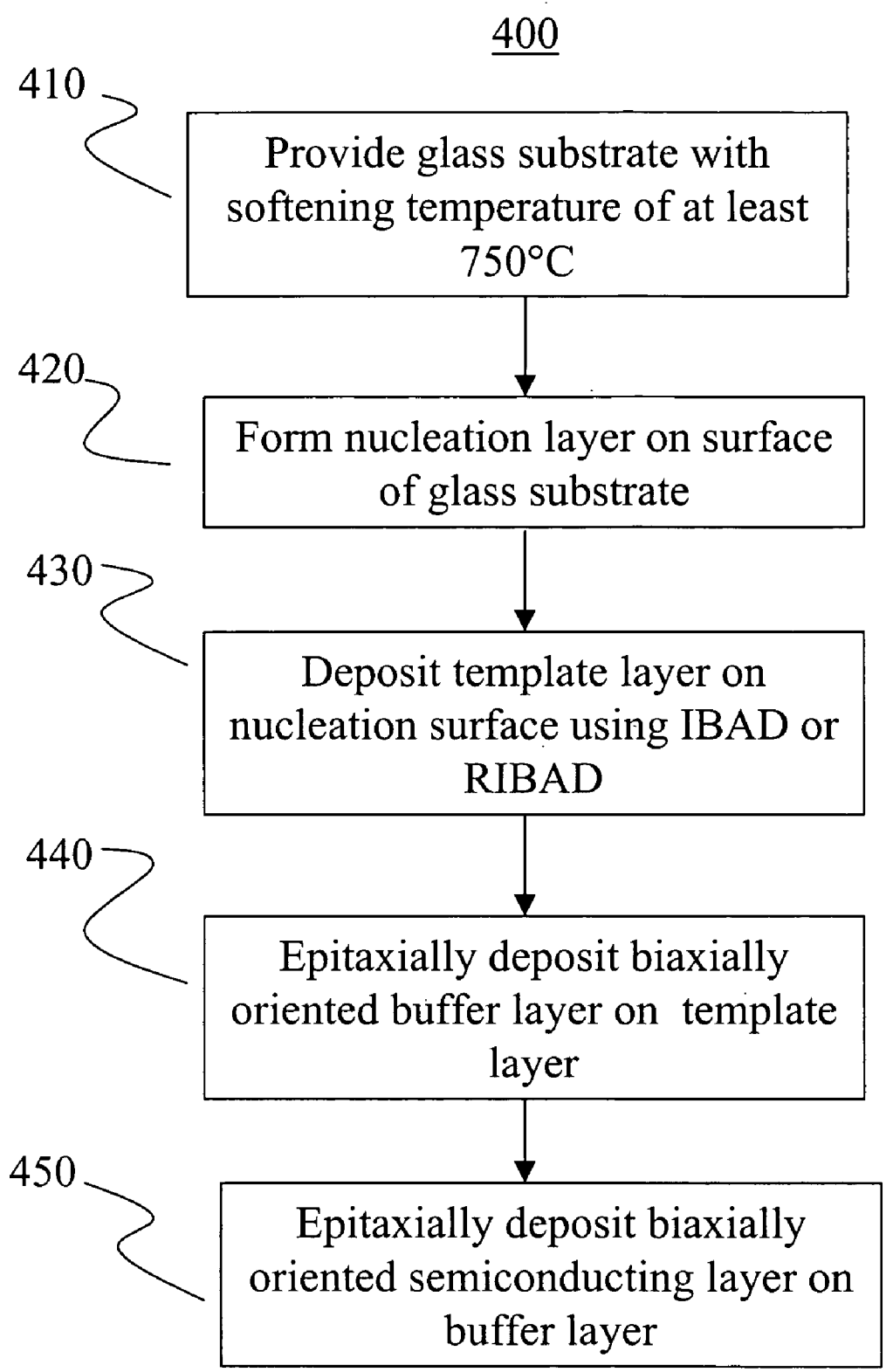

ALIGNED CRYSTALLINE SEMICONDUCTING FILM ON A GLASS SUBSTRATE AND METHOD OF MAKING

STATEMENT REGARDING FEDERAL RIGHTS

This invention was made with government support under Contract No. DE-AC 52-06 NA 25396, awarded by the U.S. Department of Energy. The government has certain rights in the invention.

BACKGROUND OF INVENTION

The invention relates to semiconducting structures, such as photovoltaic cells and flat panel displays. More particularly, the invention relates to a semiconducting structure having a glass substrate.

Many semiconductor sensor and device applications depend on the presence of a suitable epitaxial template for the growth of thin films having a high degree of crystallographic orientation. Single crystal templates that are used in conventional epitaxial growth techniques are limited to select materials and sizes. The in situ growth of such materials is generally carried out at high temperatures.

Glass substrates are of particular interest for use in applications such as sensors, solar cells, and displays. However, since glass is amorphous, it cannot be used directly as an epitaxial template in conventional epitaxial growth processes. Moreover, the temperatures required for epitaxial growth of semiconducting materials are well above the temperature at which conventional glass substrates are capable of maintaining their structural integrity. Therefore, what is needed is an epitaxially grown semiconducting structure having a glass substrate. What is also needed is a method of making such semiconducting structures.

SUMMARY OF INVENTION

The present invention meets these and other needs by providing an epitaxially grown semiconducting structure having a glass substrate. In one embodiment, the glass substrate has a softening temperature of at least about 750° C. The structure includes a nucleation layer formed on a surface of the substrate, a template layer deposited by either ion beam assisted deposition or reactive ion beam deposition on the nucleation layer, at least one biaxially oriented buffer layer epitaxially deposited on the template layer, and a biaxially oriented semiconducting layer epitaxially deposited on the buffer layer. A method of making the semiconducting structure is also described.

Accordingly, one aspect of the invention is to provide a semiconducting structure. The semiconducting structure comprises: a glass substrate; a nucleation layer disposed on a surface of the glass substrate, a template layer deposited on the nucleation layer, wherein the template layer comprises one of a metal nitride and a metal oxide, wherein the metal nitride has a face-centered cubic crystal structure, wherein the metal oxide has a face-centered cubic crystal structure, and wherein the template layer is deposited by one of ion beam assisted deposition and reactive ion beam assisted deposition; at least one biaxially oriented buffer layer epitaxially deposited on the template layer, the buffer layer comprising one of the metal oxide and the metal nitride; and a biaxially oriented semiconductor layer epitaxially deposited on the buffer layer.

A second aspect of the invention is to provide a base for a semiconducting structure. The base comprises: a glass substrate, the glass substrate having a softening temperature of at least 750° C.; a nucleation layer disposed on a surface of the glass substrate; a template layer deposited on the nucleation layer, wherein the template layer comprises one of a metal nitride and a metal oxide, wherein the metal nitride has a face-centered cubic crystal structure, wherein the metal oxide has a face-centered cubic crystal structure, and wherein the template layer is deposited by one of ion beam assisted deposition and reactive ion beam assisted deposition; and at least one biaxially oriented buffer layer epitaxially deposited on the template layer, the buffer layer comprising one of the metal oxide and the metal nitride.

A third aspect of the invention is to provide a semiconducting structure. The semiconducting structure comprises: a glass substrate, the glass substrate having a softening temperature of at least 750° C.; a nucleation layer disposed on a surface of the glass substrate; a template layer deposited on the nucleation layer, wherein the template layer comprises one of a metal nitride and a metal oxide, wherein the metal nitride has a face-centered cubic crystal structure, wherein the metal oxide has a face-centered cubic crystal structure, and wherein the template layer is deposited by one of ion beam assisted deposition and reactive ion beam assisted deposition; at least one biaxially oriented buffer layer epitaxially deposited on the template layer, the buffer layer comprising one of the metal oxide and the metal nitride; and a biaxially oriented semiconductor layer epitaxially deposited on the buffer layer.

A fourth aspect of the invention is to provide a method of making a semiconducting structure. The semiconducting structure comprises a substrate, a nucleation layer disposed on the substrate, a template layer deposited on the nucleation layer, at least one biaxially oriented buffer layer epitaxially deposited on the template layer, and a biaxially oriented crystalline semiconductor layer epitaxially deposited on the at least one buffer layer. The method comprises the steps of: providing the substrate, wherein the substrate is a glass having a softening temperature of at least 750° C.; forming the nucleation layer on a surface of the substrate; depositing the template layer on the nucleation layer by one of ion beam assisted deposition and reactive ion beam deposition, wherein the template layer comprises one of a metal nitride and a metal oxide; epitaxially depositing the at least one buffer layer on the template layer; and epitaxially depositing the biaxially oriented crystalline semiconductor layer on the at least one buffer layer.

These and other aspects, advantages, and salient features of the present invention will become apparent from the following detailed description, the accompanying drawings, and the appended claims.

BRIEF DESCRIPTION OF THE DRAWINGS

FIG. 4 is a flow chart of a method of making a semiconducting structure.

DETAILED DESCRIPTION

Figure 1:
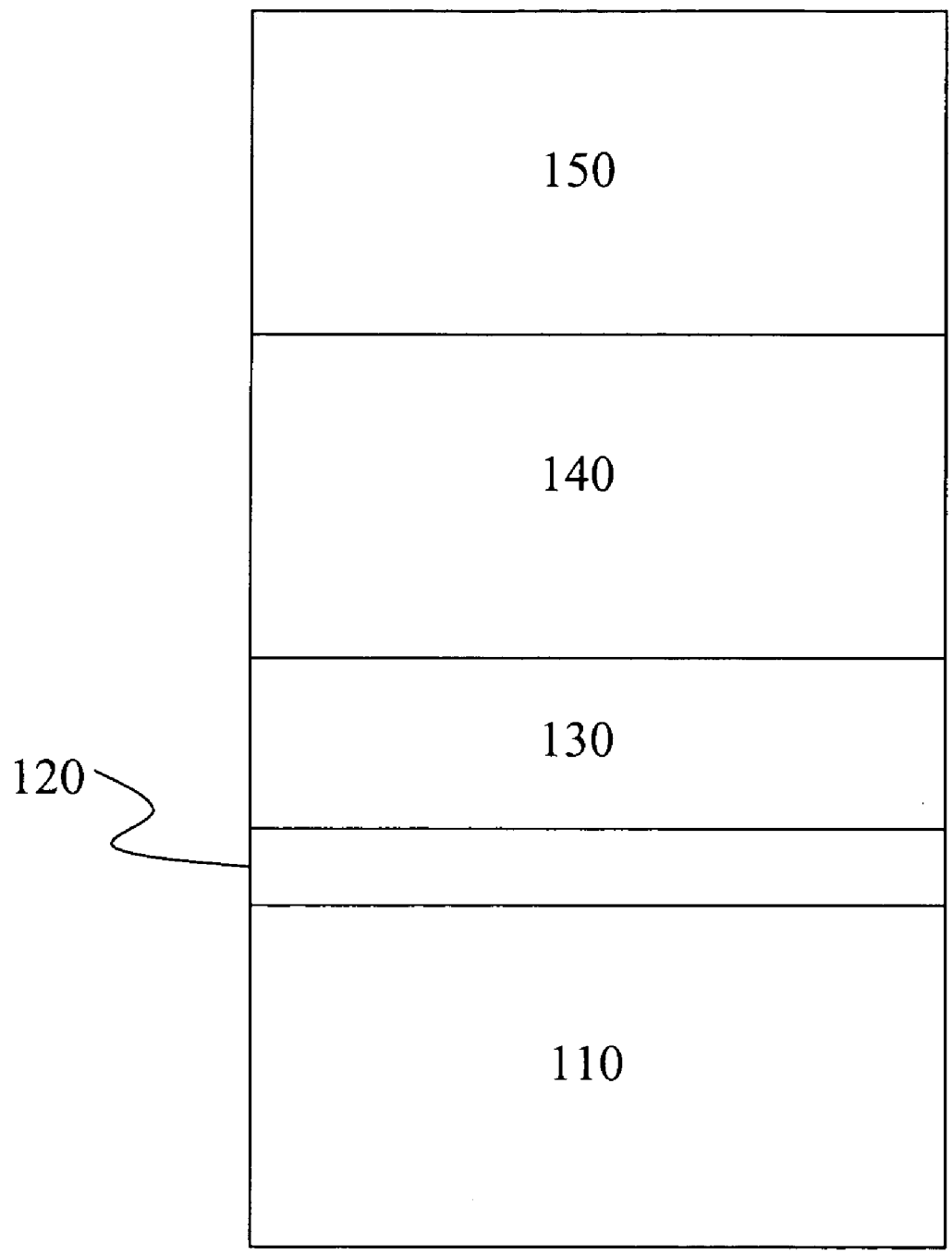
FIG. 1 is a schematic representation of one embodiment of a semiconducting structure.

In the following description, like reference characters designate like or corresponding parts throughout the several views shown in the figures. It is also understood that terms such as "top," "bottom," "outward," "inward," and the like are words of convenience and are not to be construed as limiting terms. In addition, whenever a group is described as either comprising or consisting of at least one of a group of elements and combinations thereof, it is understood that the group may comprise or consist of any number of those elements recited, either individually or in combination with each other.

Referring to the drawings in general and to FIG. 1 in particular, it will be understood that the illustrations are for the purpose of describing a particular embodiment of the invention and are not intended to limit the invention thereto. A semiconducting structure of the present invention is shown in FIG. 1. As used herein, a semiconducting structure, in one embodiment, refers to a structure that comprises a semiconducting material that is responsive to electromagnetic radiation such as, for example, light in any of the visible, ultraviolet, or infrared spectra. When photons impinge upon such a semiconducting material, free electrons and, consequently, an electronic signal, are generated. Such semiconducting structures include, but are not limited to, solar cells, photovoltaic cells, and the like. Alternatively, the semiconducting structure described herein may have other applications such as, for example, in flat panel displays.

Turning to FIG. 1, semiconducting structure 100 comprises a glass substrate 110. A nucleation layer 120 is disposed on a surface of substrate 110. A template layer 130 is deposited on nucleation layer 120. At least one biaxially oriented buffer layer 140 is epitaxially deposited on template layer 130. An aligned crystalline semiconductor layer 150 is epitaxially deposited on the at least one buffer layer 140.

Substrate 110 is a glass that has is substantially inert and capable of withstanding processing temperatures that are used to form semiconducting structure 100. Furthermore, substrate 110 must also have a coefficient of thermal expansion (CTE) that is close to the CTE of the material comprising the aligned crystalline semiconductor layer (150 in FIG. 1). The "match" between the CTEs enables the formation of a thicker aligned crystalline semiconductor layer. The processing temperatures are typically in a range from about 600° C. up to the softening temperature of the glass substrate. In one embodiment, the glass has a softening temperature of at least about 750° C. In another embodiment, the softening temperature is in a range from about 750° C. to about 1100° C., and, in one particular embodiment, the softening temperature is about 985° C. As used herein, the softening temperature of a glass is understood to be the softening point of the glass, as determined by the standard test method ASTM C338, as approved in 2003. One example of a glass that is suitable for use as substrate 110 is Corning Eagle 2000™ glass.

Nucleation layer 120 enables crystallographic texturing of the template layer 120. In one embodiment, nucleation layer 120 is formed by treating a surface of substrate 110 using ion bombardment. The surface of substrate 110 is typically bombarded with $Ar^+$ ions. Bombardment is typically carried out for about 1 to 10 minutes using ions having energies in a range from about 100 eV up to about 1000 eV and an ion current density in a range from about 0.1 $mA/cm^2$ to about 1.0 $mA/cm^2$. In another embodiment, nucleation layer 120 comprises an oxide such as, but not limited to, yttrium oxide ($Y_2O_3$), silicon oxide, or the like. Alternatively, nucleation layer 140 may comprise a nitride. For example, amorphous $Si_3N_4$ has been used as a nucleation layer for a magnesium oxide (MgO) template layer 130 deposited by ion beam assisted (IBAD) deposition. Nucleation layer 140 comprising either an oxide or nitride may be deposited by electronic beam (e-beam) evaporation (with or without ion beam assistance), and has a thickness between about 5 nm and about 500 nm. Other methods known in the art, such as sol-gel methods, chemical vapor deposition (CVD), sputtering and other physical vapor deposition (PVD) methods, and the like may be used as well.

Figure 3:
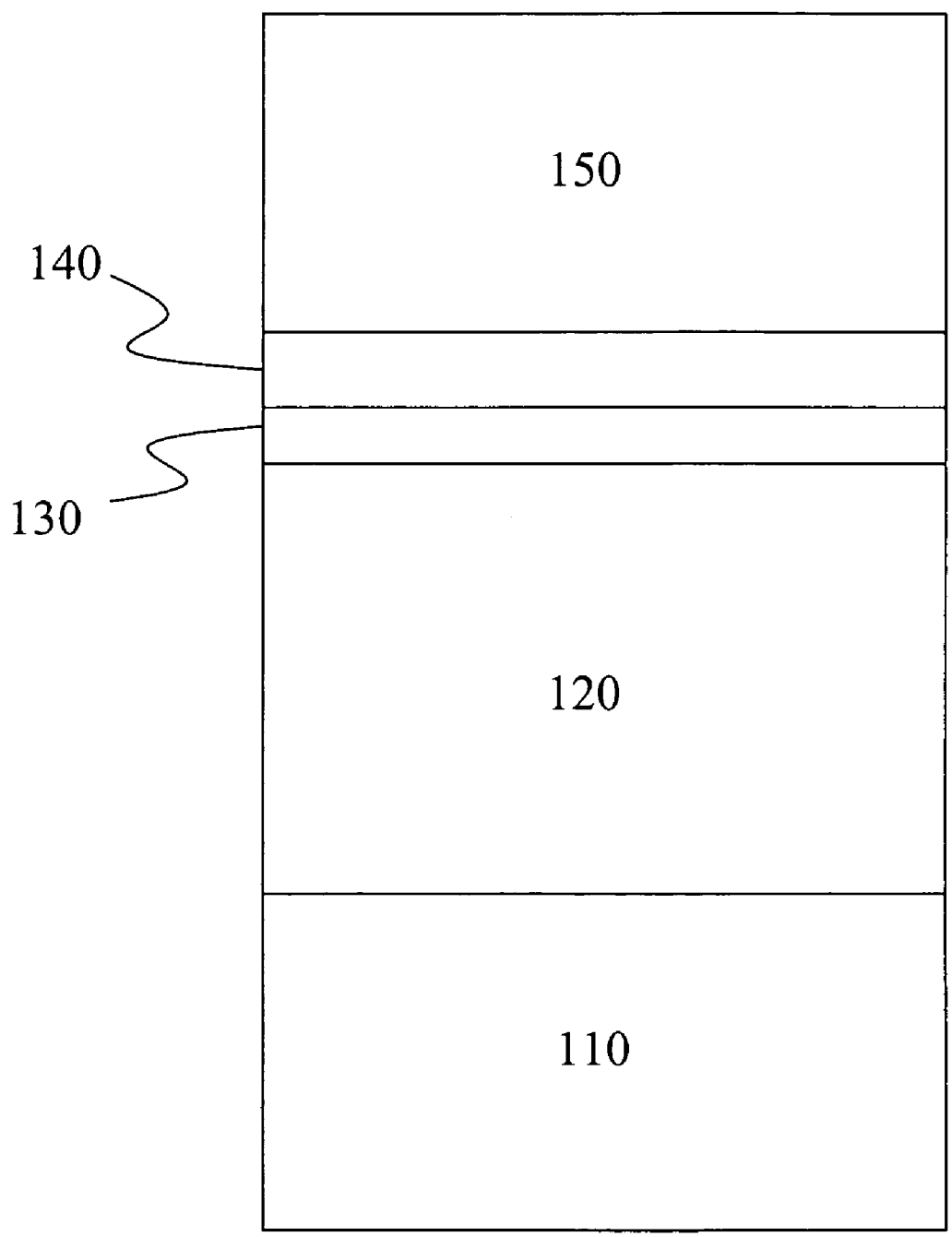
FIG. 3 is a schematic representation of a third embodiment of a semiconducting structure.

In one embodiment, shown in FIG. 3, semiconducting structure 300 includes nucleation layer 120 that is one of silicon oxide, silicon nitride, or combinations thereof, and has a thickness in a range from about 5 nm to about 500 nm. The increased thickness of nucleation layer 120 serves to smooth any roughness on the surface of substrate 100 and provides a more effective diffusion barrier between substrate 110 and semiconducting layer 150. In addition, the increased thickness of nucleation layer 120 allows the thicknesses of template layer 130 and the at least one buffer layer 140 to be correspondingly reduced. In this embodiment, template layer 130 and the at least one buffer layer 140 have a combined thickness in a range from about 3 nm to about 500 nm. In this embodiment, nucleation layer 120 may be deposited by either IBAD or reactive ion beam assisted deposition (RIBAD).

As used herein, an "epitaxial" or "epitaxially deposited" layer is a layer in which the biaxial orientation or crystallographic texture of the underlying "host" material (e.g., a template or buffer layer) onto which the layer is grown defines a corresponding biaxial orientation or crystallographic texture in the epitaxial layer. The underlying material and the epitaxially deposited layer need not have the same crystal structure. As used herein, the terms "biaxially oriented" and "biaxial orientation" refer to a surface or layer in which the crystal grains are in close alignment both in the plane and out of the plane (i.e., perpendicular to the plane) of the surface of the layer. One type of biaxially oriented surface is a cubic textured surface in which the crystal grains are in close alignment with directions both parallel and perpendicular to the surface.

IBAD has been widely used in the preparation of high temperature superconducting films in coated conductors. IBAD texturing can produce nearly single-crystalline films with crystallographic properties approaching those of conventional epitaxial thin films by using an off-normal ion beam to establish a preferred orientation for film growth on a non-single-crystalline (i.e., amorphous or polycrystalline) substrate. Once established, this IBAD layer serves as a biaxially-oriented template for the epitaxial growth of subsequent layers. The principles of IBAD are described in U.S. Pat. No. 5,650,378 by Yauhiro Iijima et al., entitled "Method of making Polycrystalline Thin Film and Superconducting Body," issued on Jul. 22, 1997, and U.S. Pat. No. 5,872,080 by Paul N. Arendt et al., entitled "High Temperature Superconducting Thick Films, issued Feb. 16, 1999. The contents of U.S. Pat. Nos. 5,650,378 and 5,872,080 are incorporated herein by reference in their entirety.

Template layer 130 establishes a crystallographic template upon which successive layers of material having the same or similar crystallographic orientation or texture may be deposited. Template layer 130 has a biaxially oriented texture. Template layer 130, in one embodiment, comprises a nitride having a face-centered cubic structure. In one embodiment, the nitride is electrically conducting. The nitride is selected from the group consisting of titanium nitride, nickel nitride, tantalum nitride, aluminum nitride, chromium nitride, silicon nitride, gallium nitride, carbon nitride, and combinations thereof. Template layer 130 has a thickness in a range from about 0.01 micrometer to about 0.1 micrometer. In one embodiment, the metal nitride is deposited on nucleation layer 120 by IBAD. In one non-limiting example, a titanium nitride (TiN) layer having biaxial texture and a thickness of about 0.01 micrometer may be deposited at room temperature using reactive ion beam assisted deposition (RIBAD). During deposition by RIBAD, the nitride is formed by providing the metal constituent of the metal nitride to nucleation layer 120 by either physical vapor deposition or chemical vapor deposition, while directing a beam comprising $Ar^+$ and $N^+$ ions at nucleation layer 120 at a predetermined angle (usually about 45°) from an axis normal to substrate 210. In one particular embodiment, template layer 130 comprises titanium nitride deposited using RIBAD.

In another embodiment, template layer 130 comprises a metal oxide having a face-centered cubic crystal structure. In one embodiment, the metal oxide is electrically insulating. The metal oxide is selected from the group consisting of magnesium oxide, calcium oxide, strontium oxide, barium oxide, titanium oxide, zirconium oxide, vanadium oxide, niobium oxide, tantalum oxide, chromium oxide, manganese oxide, iron oxide, cobalt oxide, nickel oxide, cadmium oxide, scandium oxide, lanthanum oxide, cerium oxide, neodymium oxide, samarium oxide, europium oxide, ytterbium oxide, and combinations thereof. The metal oxide may be deposited on nucleation layer 120 by either IBAD or RIBAD. In one particular embodiment, template layer comprises magnesium oxide deposited using IBAD.

The at least one buffer layer 140 is epitaxially deposited on template layer 130 and is biaxially oriented with respect to template layer 130. Buffer layer 140 extends the crystalline order established by template layer 130 to achieve a desired thickness. In addition, the at least one buffer layer 140 provides a diffusion barrier between substrate 110 and aligned crystalline semiconductor layer 150.

Figure 2:
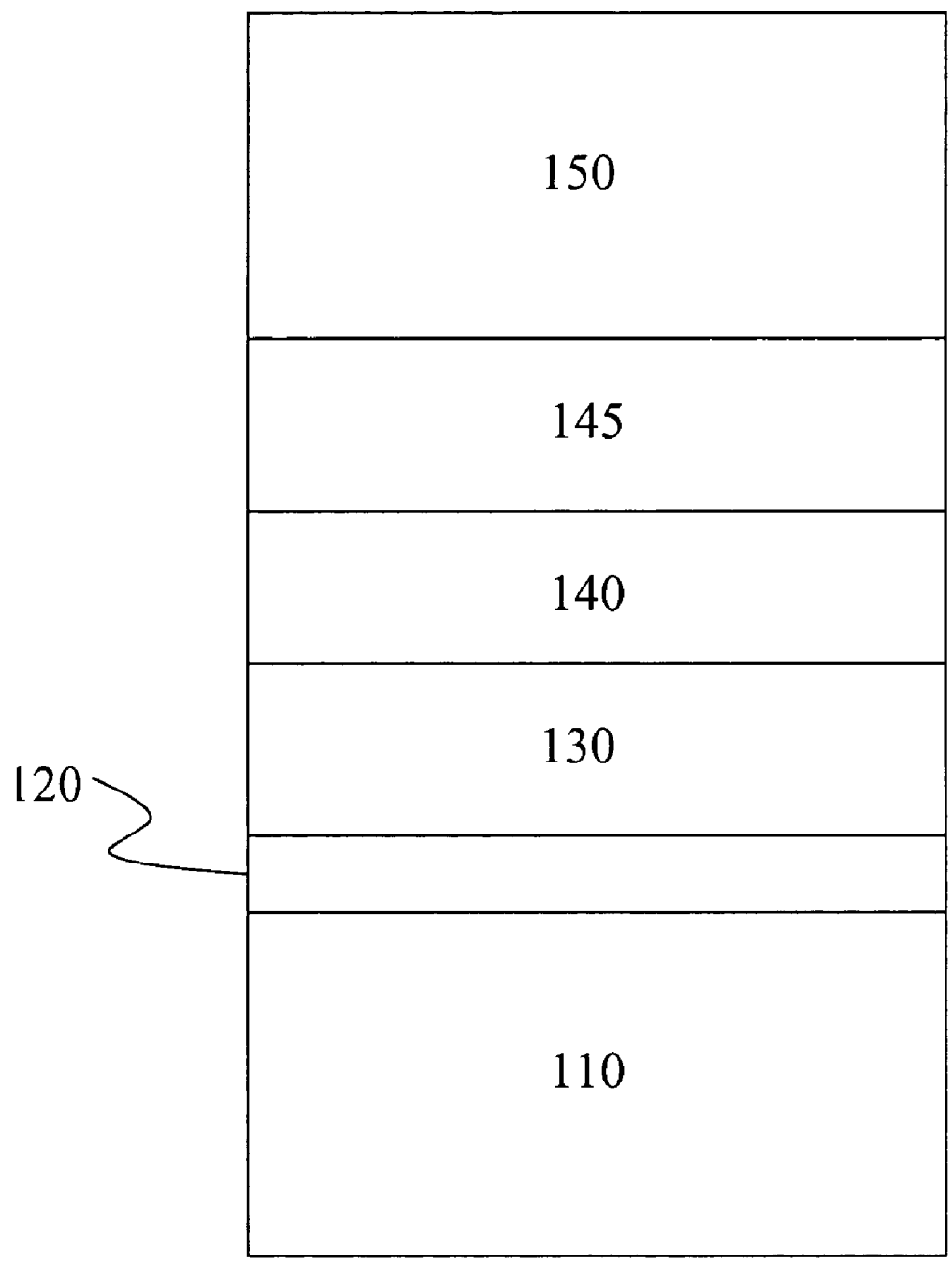
FIG. 2 is a schematic representation of a second embodiment of a semiconducting structure.

In one embodiment, the at least one buffer layer 140 comprises the same nitride or oxide comprising template layer 130 and is homoepitaxially deposited on template layer 130. For example, where template layer 130 comprises titanium nitride, the at least one buffer layer 140 may comprise TiN that is homoepitaxially deposited on template layer 130. In another embodiment shown in FIG. 2, the at least one buffer layer 140 of semiconducting structure 200 includes a second buffer layer 145 comprising an oxide or nitride other than the oxide or nitride comprising buffer layer 140 and template 130. For example, where template layer 130 and buffer layer 140 comprise magnesium oxide, a second buffer layer 145 comprising γ-alumina is deposited on buffer layer 140.

The thickness of the at least one buffer layer 140 depends on the specific application of semiconducting structure 100. In one embodiment, the at least one buffer layer 140 has a thickness in a range from about 0.01 micrometer to about 1 micrometer. The at least one buffer layer 140 may be formed by various deposition methods known in the art, such as pulsed laser deposition; evaporative methods such co-evaporation, e-beam evaporation, activated reactive evaporation, and the like; sputtering techniques, including magnetron sputtering, ion beam sputtering, ion assisted sputtering, and the like; cathodic arc deposition; chemical vapor deposition methods, including organometallic chemical vapor deposition, plasma enhanced chemical vapor deposition, and the like; molecular beam epitaxy; sol-gel processes; casting; ribbon-growth-on-substrate (RGS); and liquid phase epitaxy. For example, a homoepitaxial titanium nitride (TiN) layer having a thickness in a range from about 0.1 micrometer to about 1 micrometer may be deposited by reactive sputtering onto a TiN template layer such as that described above.

Biaxially oriented semiconductor layer 150 is epitaxially grown upon the at least one buffer layer 140. In one embodiment, biaxially oriented semiconductor layer 150 comprises at least one of silicon, germanium, cadmium telluride (CdTe), cadmium sulfide (CdS), copper indium selenide ($CuInSe_2$), copper indium sulfide ($CuInS_2$), copper indium gallium selenide ($CuGaInSe_2$), gallium arsenide (GaAs), carbon nitride, and combinations thereof. In one particular embodiment, biaxially oriented semiconductor layer 150 is biaxially oriented silicon. As previously described, the biaxially oriented semiconductor layer 150 includes a plurality of crystal grains that are in close crystallographic alignment both in the plane and out of the plane (i.e., perpendicular to the plane) of the surface of biaxially oriented semiconductor layer 150. Additionally, the crystal grains within biaxially oriented semiconductor layer 150 are in close crystallographic alignment with the crystal grains within the at least one buffer layer 140.

Biaxially oriented semiconductor layer 150 may include at least one of multiple layers, dopant profiles, and composition profiles to establish junctions within the layer and to achieve a desired purpose. Such dopant and composition profiles may be varied three dimensionally, across both the thickness and the plane of biaxially oriented semiconducting layer 150. Examples of such junctions include p-n junctions, p-I-n junctions, and Schottky barrier junctions. The structures of such junctions and methods of making them are well known in the art.

Biaxially oriented semiconductor layer 150 may be deposited, for example, by: pulsed laser deposition; evaporative methods such as co-evaporation, e-beam evaporation, activated reactive evaporation and the like; sputtering techniques, including magnetron sputtering, ion beam sputtering, ion assisted sputtering, and the like, cathodic arc deposition; chemical vapor deposition methods, including organometallic chemical vapor deposition, plasma enhanced chemical vapor deposition, and the like; molecular beam epitaxy; sol-gel processes; casting; ribbon-growth-on-substrate (RGS); and liquid phase epitaxy. Biaxially oriented semiconductor layer 150 may be deposited entirely by any one of the above techniques. Alternatively, one such technique could be used to deposit an initial—or seed—layer, and another technique could be used to add thickness to the layer. For example, biaxially oriented semiconductor layer 150 may first be deposited as either an amorphous phase, a nanocrystalline phase, or a polycrystalline phase at low temperature (i.e., less than 500° C.) by one of the above mentioned techniques, and then crystallized to obtain a biaxial texture. The crystallization may be carried out using either a fast process, such as pulsed laser annealing, or a slow process, such as solid phase crystallization. Deposition of biaxially oriented semiconductor layer 150 is generally conducted under low vacuum conditions so as to minimize formation of oxides.

The thickness of biaxially oriented semiconductor layer 150 depends upon the intended application of semiconducting structure 100. For photovoltaic applications, for example, semiconductor layer 150 has a thickness in a range from about 100 nm to about 30 micrometers. For display applications semiconductor layer 150 has a thickness in a range from about 50 nm to about 500 nm.

The invention also provides a method of making the semiconducting structure 150 described herein. A flow chart of method 400 is shown in FIG. 4. In Step 410, a glass substrate having a softening temperature of at least 750° is provided. A nucleation layer is formed on a surface of: the substrate (Step 420) by either modifying the surface using ion bombardment, electron beam evaporation, sol-gel methods, chemical vapor deposition methods, casting, ribbon- growth-on-substrate (RGS), sputtering, other physical vapor deposition (PVD) methods, or the like. In Step 430, a template layer is deposited on the nucleation layer using either ion beam assisted deposition or reactive ion beam assisted deposition. Next, at least one biaxially oriented buffer layer is epitaxially deposited on the template layer (Step 440). The buffer layer is deposited using one of: pulsed laser deposition; evaporative methods such co-evaporation, e-beam evaporation, activated reactive evaporation and the like; sputtering techniques, including magnetron sputtering, ion beam sputtering, ion assisted sputtering, and the like; cathodic arc deposition; chemical vapor deposition methods, including organometallic chemical vapor deposition, plasma enhanced chemical vapor deposition, and the like; molecular beam epitaxy; sol-gel processes; casting; ribbon- growth-on-substrate (RGS); and liquid phase epitaxy. Finally, a biaxially oriented semiconductor layer is epitaxially deposited (Step 450) to complete the semiconducting structure. The biaxially oriented semiconductor layer is deposited using one of pulsed laser deposition; evaporative methods such co-evaporation, e-beam evaporation, activated reactive evaporation and the like; sputtering techniques, including magnetron sputtering, ion beam sputtering, ion assisted sputtering, and the like; cathodic arc deposition; chemical vapor deposition methods, including organometallic chemical vapor deposition, plasma enhanced chemical vapor deposition, and the like; molecular beam epitaxy; sol-gel processes; casting; ribbon-growth-on-substrate (RGS); and liquid phase epitaxy.

The invention additionally provides a base for a semiconducting structure. The base comprises: a glass substrate having a softening temperature of at least 750° C.; a nucleation layer disposed on a surface of the glass substrate; a template layer deposited on the nucleation layer by one of ion beam assisted deposition and reactive ion beam assisted deposition; and at least one biaxially oriented buffer layer epitaxially deposited on the template layer. The composition and methods of making each of the nucleation layer, template layer, and the at least one buffer layer have been described hereinabove. A biaxially oriented semiconducting layer, such as any of those described herein, may be epitaxially deposited on the base.

The following examples illustrate the features and advantages of the invention, and are in no way intended to limit the invention thereto.

EXAMPLE 1

Biaxially oriented silicon films were grown on buffered glass substrates as follows. Substrates consisting of Corning Eagle 2000™ glass, having dimensions of 10 mm length×10 mm width×0.7 mm thickness, were ultrasonically cleaned in isopropanol. The back side of each glass substrate was painted with carbon paint to allow for uniform and stable heating by quartz lamps during multi-layer film growth. The cleaned and painted glass substrates were clipped to carriers in a reel-to-reel system with the painted side exposed to direct quartz lamp light during heating. Throughout the deposition process, heating and cooling was done slowly (~50° C./min above 550° C.).

The surfaces of the glass substrates were ion-sputtered to create texture on the glass substrate to serve as a nucleation layer for the subsequent IBAD growth. Using a 6 cm×22 cm rf ion source, the glass substrate was exposed to 750 eV/30 mA $Ar^+$ ions for about 15 minutes to form the nucleation layer. The ion beam was directed at 45 degrees to the substrate normal.

A magnesium oxide (MgO) template layer was grown using IBAD. The IBAD process used 750 eV/30 mA $Ar^+$ ions directed at 45 degrees to the substrate normal. MgO deposition occurred at a rate of about 0.06 to about 0.07 nm/s. The total thickness of the deposited MgO layer was about 6 nm.

An epitaxial MgO buffer layer was grown by e-beam evaporation at a rate of 0.1 nm/s. The total thickness of the epitaxial MgO layer was 100 nm. Temperature was slowly varied from about 460° C. to about 690° C. during deposition. An epitaxial γ-alumina buffer layer was then grown on the MgO buffer layer at a rate of 0.1 nm/s. The total thickness of the deposited γ-alumina buffer layer was 100 nm. The temperature was held steady at 780° C. during deposition.

A silicon layer that was heavily p-doped ($p^{++}$) was grown on the γ-alumina buffer layer at a rate of 0.5 nm/s at about 760° C. by e-beam evaporation. The silicon layer had a thickness of 1 micrometer. A lightly p-doped (p) silicon layer was then grown on the highly doped Si layer at a rate of 0.5 nm/s at about 760° C. The lightly doped layer had a thickness of about 3 micrometers.

Epitaxial layer growth was monitored and observed for all buffer layers on the MgO layer grown by IBAD, as well as for the Si layers. The biaxial orientation of the Si layers was further confirmed by x-ray analysis.

EXAMPLE 2

Biaxially oriented silicon films were grown on buffered glass substrates as follows. Substrates consisting of Corning Eagle 2000™ glass, having dimensions of 10 mm length×10 mm width×0.7 mm thickness, were ultrasonically cleaned in isopropanol. The back side of each glass substrate was painted with carbon paint to allow for uniform and stable heating by quartz lamps during multi-layer film growth. The cleaned and painted glass substrates were clipped to carriers in a reel-to-reel system with the painted side exposed to direct quartz lamp light during heating. Throughout the deposition process, heating and cooling was done slowly (~50° C./min above 550° C.).

The glass substrate was exposed to 750 eV/30 mA $Ar^+$ ions for about 1 minute to remove hydrocarbons and other types of residues from the surface of the glass substrate. The ion beam was directed at 45 degrees to the substrate normal.

Silicon oxide was deposited using e-beam evaporation to serve as a nucleation layer. Silicon was deposited by e-beam evaporation at a rate of about 0.2 nm/sec with reactive ion assistance of 600 eV/40 mA $Ar^+$ and $O^+$ ion beams, with a $Ar:O_2$ flow ratio of about 1. The silicon-oxide nucleation layer produced amorphous/nano-crystalline diffuse RHEED patterns at nominal thicknesses of both 80 nm and 240 nm.

A RIBAD MgO buffer layer was grown with 1000 eV/40 mA $Ar^+$ and $O^+$ ions, with a $Ar:O_2$ flow ratio of about 1. The ion beam was directed at 45 degrees to the substrate normal. Magnesium was deposited at a rate of about 0.2 nm/s. The total thickness of the MgO layer was about 6 nm.

An epitaxial MgO buffer layer was grown by e-beam evaporation at a rate of 0.1 nm/s. The total thickness of the epitaxial MgO layer was 100 nm. Temperature was slowly varied from about 460° C. to about 690° C. during deposition. An epitaxial γ-alumina buffer layer was then grown on the MgO buffer layer at a rate of 0.1 nm/s. The total thickness of the deposited γ-alumina buffer layer was 100 nm. The temperature was held steady at 780° C. during deposition.

A heavily p-doped ($p^{++}$) silicon layer was grown on the γ-alumina buffer layer at a rate of 1 nm/s at about 760° C. by e-beam evaporation. The silicon layer had a thickness of 0.4 micrometer. A lightly p-doped (p) silicon layer was then grown on the highly doped Si layer at a rate of 0.5 nm/s at about 760° C. The lightly doped layer had a thickness of about 3 micrometers.

Epitaxial layer growth was monitored and observed for all buffer layers on the MgO layer grown by RIBAD, as well as for the Si layers.

EXAMPLE 3

Biaxially oriented silicon films were grown on buffered glass substrates as follows. Substrates consisting of Corning Eagle 2000™ glass, having dimensions of 10 mm length×10 mm width×0.7 mm thickness, were ultrasonically cleaned in isopropanol. The back side of each glass substrate was painted with carbon paint to allow for uniform and stable heating by quartz lamps during multi-layer film growth. The cleaned and painted glass substrates were clipped to carriers in a reel-to-reel system with the painted side exposed to direct quartz lamp light during heating. Throughout the deposition process, heating and cooling was done slowly (~50° C./min above 550° C.).

The glass substrate was exposed to 750 eV/30 mA $Ar^+$ ions for about 1 minute to remove hydrocarbons and other types of residues from the surface of the glass substrate. The ion beam was directed at 45 degrees to the substrate normal.

Silicon nitride was deposited using e-beam evaporation to serve as a nucleation layer. Silicon was deposited by e-beam evaporation at a rate of about 0.2 nm/sec with reactive ion assistance of 600 eV/40 mA $Ar^+$ and $N^+$ ion beams, with a $Ar:N_2$ flow ratio of about 1 to serve as a nucleation layer. The silicon nitride nucleation layer produced amorphous/nano-crystalline diffuse RHEED patterns at nominal thicknesses of both 80 nm and 240 nm, as well as at several nominal thicknesses between 80 nm and 240 nm.

A RIBAD titanium nitride layer was grown with 1000 eV/40 mA $Ar^+$ and $N^+$ ions, with a $Ar:N_2$ flow ratio of about 1. The ion beam was directed at 45 degrees to the substrate normal. Titanium was deposited at a rate of about 0.2 nm/s. The total thickness of the TiN layer was about 6 nm.

An epitaxial TiN buffer layer was grown by reactive sputtering at a rate of 0.1 nm/s at a temperature of about 550° C. The total thickness of the epitaxial TiN layers were 50 nm, 100 nm, and 200 nm.

Silicon layers were hetero-epitaxially grown on the TiN buffer layer at rates ranging from about 0.5 nm/s to about 2 nm/s at about 760° C. by e-beam evaporation. The silicon layers had thicknesses ranging from about 0.4 micrometer to about 4 micrometer.

Epitaxial layer growth was monitored and observed for all buffer layers grown on the RIBAD layer as well as for all Si layers.

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

The invention claimed is:

1. A semiconducting structure comprising:
   a. a glass substrate;
   b. a nucleation layer contacting the glass substrate, the nucleation layer selected from the group consisting of a silicon oxide film, a silicon nitride film, or a nucleation layer formed by subjecting a surface portion of the glass substrate to ion bombardment with Ar+ having energies in a range of from about 100 eV to about 1000 eV to prepare it for deposition of a template layer thereon;
   c. a template layer deposited on the nucleation layer, wherein the template layer comprises one of a metal nitride and a metal oxide, wherein the metal nitride has a face-centered cubic crystal structure, wherein the metal oxide has a face-centered cubic crystal structure, and wherein the template layer is deposited by one of ion beam assisted deposition and reactive ion beam assisted deposition;
   d. at least one biaxially oriented buffer layer epitaxially deposited on the template layer, the buffer layer comprising one of the metal oxide and metal nitride; and
   e. a biaxially oriented semiconductor layer epitaxially deposited on the buffer layer.

2. The semiconducting structure according to claim 1, wherein the glass substrate has a softening temperature of at least 750° C.

3. The semiconducting structure according to claim 1, wherein the nucleation layer has a thickness in a range from about 5 nm to about 500 nm.

4. The semiconducting structure according to claim 3, wherein the template layer and the buffer layer have a combined thickness in a range from about 3 nm to about 500 nm.

5. The semiconducting structure according to claim 1, wherein the template layer comprises a metal oxide selected from the group consisting of magnesium oxide, calcium oxide, strontium oxide, barium oxide, titanium oxide, zirconium oxide, vanadium oxide, niobium oxide, tantalum oxide, chromium oxide, manganese oxide, iron oxide, cobalt oxide, nickel oxide, cadmium oxide, scandium oxide, lanthanum oxide, cerium oxide, neodymium oxide, samarium oxide, europium oxide, ytterbium oxide, and combinations thereof.

6. The semiconducting structure according to claim 5, wherein the metal oxide is magnesium oxide.

7. The semiconducting structure according to claim 6, wherein the at least one buffer layer comprises a first buffer layer comprising magnesium oxide and a second buffer layer epitaxially deposited on the buffer layer.

8. The semiconducting structure according to claim 7, wherein the second buffer layer comprises y-aluminum oxide.

9. The semiconducting structure according to claim 1, wherein the semiconductor layer comprises at least one of silicon, germanium, cadmium telluride, cadmium sulfide, copper indium selenide, copper indium sulfide, copper indium gallium selenide, gallium arsenide, carbon nitride, a semiconducting oxide, and combinations thereof.

10. The semiconducting structure according to claim 9, wherein the semiconductor layer comprises silicon.

11. The semiconducting structure according to claim 9, wherein the semiconductor layer has a thickness in a range from about 0.1 micrometer to about 30 micrometers.

12. The semiconducting structure according to claim 1, wherein the semiconducting structure forms at least a portion of a flat panel display or a photovoltaic cell.

13. A base for a semiconducting structure, the base comprising:
   a. a glass substrate having a softening temperature of at least 750° C.;
   b. a nucleation layer contacting the glass substrate, the nucleation layer selected from the group consisting of a silicon oxide film, a silicon nitride film, or a nucleation layer formed by subjectinq a surface portion of the glass substrate to ion bombardment with Ar+ having energies in a range of from about 100 eV to about 1000 eV to prepare it for deposition of a template layer thereon;

c. a template layer deposited on the nucleation layer, wherein the template layer comprises one of a metal nitride and a metal oxide, wherein the metal nitride has a face-centered cubic crystal structure, wherein the metal oxide has a face-centered cubic crystal structure, and wherein the template layer is deposited by one of ion beam assisted deposition and reactive ion beam assisted deposition; and d. at least one biaxially oriented buffer layer epitaxially deposited on the template layer, the buffer layer comprising one of the metal oxide and the metal nitride.

\* \* \* \* \*